Feb. 28, 1967 E. J. ZEITLIN 3,307,199

TAPE FEED RELEASE FOR A RECORDER

Filed Oct. 15, 1964 2 Sheets-Sheet 1

INVENTOR.
EDWARD J. ZEITLIN

BY

AGENT

Feb. 28, 1967 E. J. ZEITLIN 3,307,199

TAPE FEED RELEASE FOR A RECORDER

Filed Oct. 15, 1964 2 Sheets-Sheet 2

INVENTOR.
EDWARD J. ZEITLIN

BY Howard T. Jeandron

AGENT

United States Patent Office 3,307,199
Patented Feb. 28, 1967

3,307,199
TAPE FEED RELEASE FOR A RECORDER

Edward J. Zeitlin, New York, N.Y., assignor to Standard Instruments Corporation, New York, N.Y.

Filed Oct. 15, 1964, Ser. No. 404,079
2 Claims. (Cl. 346—114)

This invention relates to a counter totalizing recorder device and more particularly to the means of releasing the tape feeding device within the counter totalizing recorder.

The particular device with which this invention is concerned is an apparatus for timing the operation of a device. This apparatus takes the form of a boxlike structure in which a roll of recording tape is stored and in which the tape is threaded over a feeding drum and a pair of marking points or stylus are provided to record upon the tape. The feeding drum is connected by gearing to a chronograph to drive the feeding drum and keep the progression of the tape in exact timing with the minutes and hours that are marked upon the tape. In the use of this device it is apparent that the tape marked in minutes and hours and days, the tape must be freely moved for setting the tape at a correct starting time. Therefore the feeding drum must have a release from the drive to permit freely rotating the feeding drum by pulling the tape forward until the correct day, hour and minute appears upon the tape for a correct starting setting.

It is an object of this invention to provide a frictionally compressed gear drive for the feeding drum of the tape in the counter totalizing recorder in which the frictionally compressed gear drive may be quickly and easily released to permit free rotation of the feeding drum.

A further object of this invention is to provide a gear drive for the feeding drum of the tape in the counter totalizing recorder in which the gear drive is quickly and easily released to permit free rotation of said feed drum.

Figure 1:
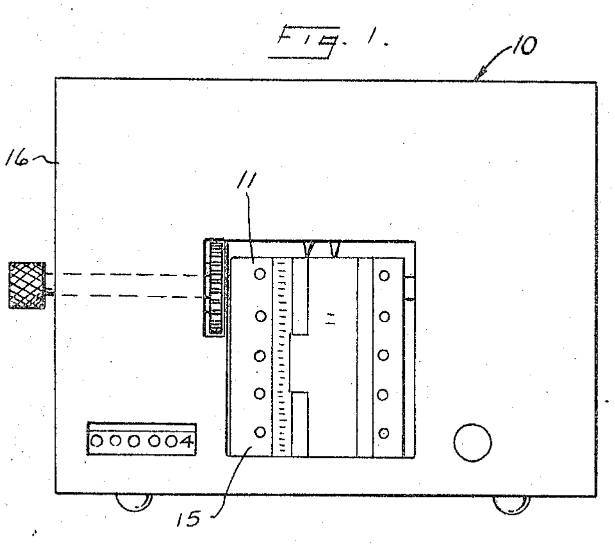
Figure 2:
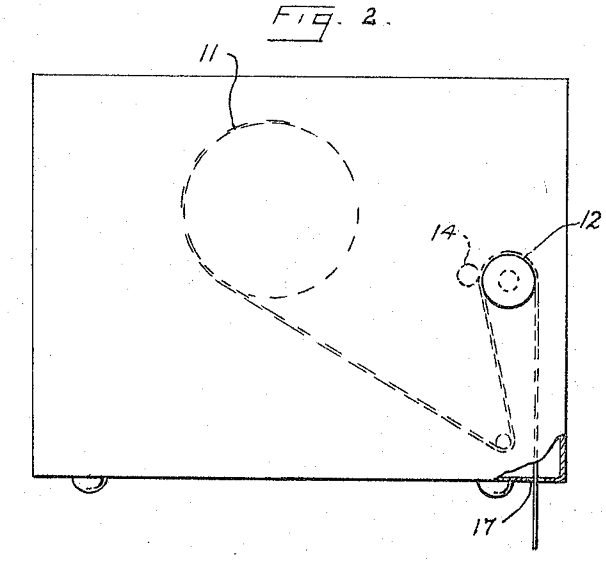
Figure 3:
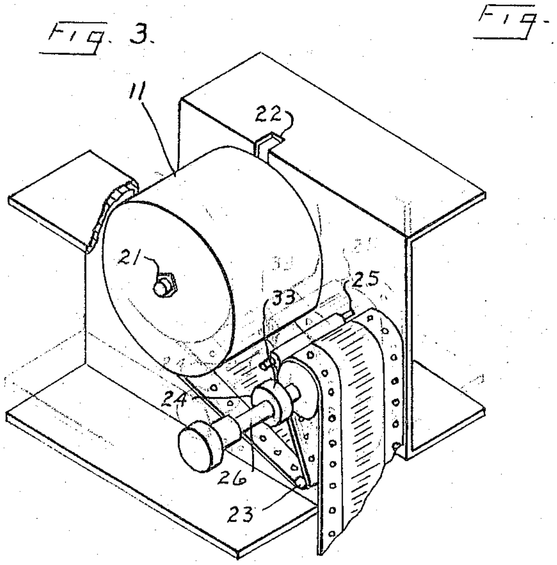
Figure 5:
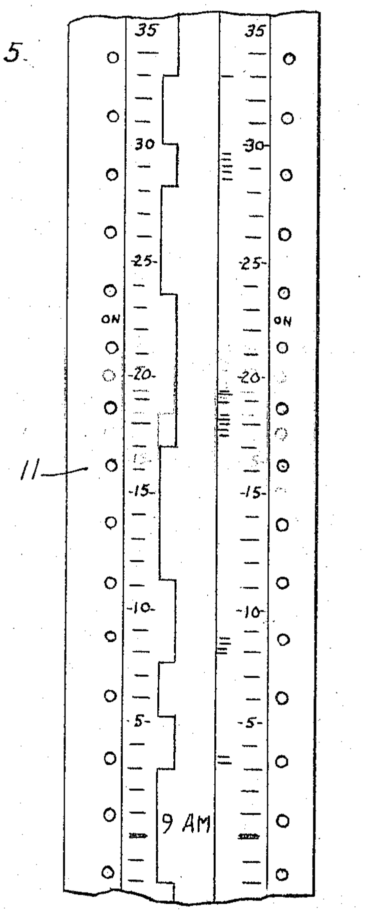
Figure 4:
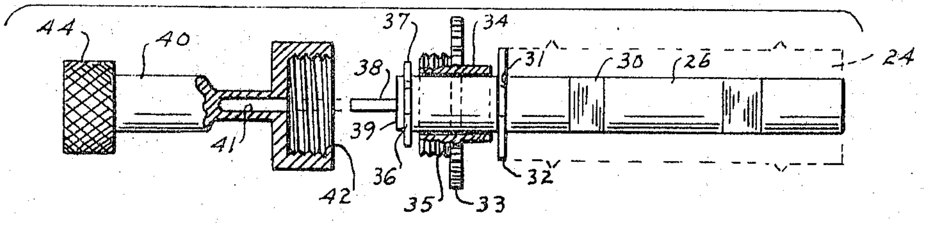

Further objects of this invention shall be apparent by reference to the accompanying detailed description and the drawings in which FIG. 1 is a front elevational view of the recorder, FIG. 2 is a side elevational view of the recorder, FIG. 3 is a perspective view of the tape feeding drum and release mechanism within the recorder, FIG. 4 is an exploded detail view of the release mechanism for the feeding drum, and FIG. 5 is an elevational view of a section of tape.

Referring to the drawings there is illustrated in FIGS. 1 and 2 a counter totalizing recorder 10 and mounted within the recorder 10 there is a recording tape 11 stored as a spool supply. The recording tape 11 is threaded around a feed drum 12 and retained in feeding relation by a spring-pressed roller 14. Tape 11 progresses past a window 15 in the recorder casing 16 and is fed out of the casing 16 through a lower aperture 17. Within the casing 16 there is a framework 20 supporting the spool of tape 11 by a rod 21 that is fitted into a pair of slots 22, one on each side of said spool of tape 11. Thus the spool is freely rotatable in its suspended position. The tape is positioned as illustrated in FIG. 3 so that it will feed from its lower portion in a counterclockwise rotation. The tape from the spool is passed under a shaft 23 around shaft 23 and between a feed drum 24 and a roller 25. The roller 25 is supported on either side by the framework 20. Likewise feed drum 24 is supported on either side by framework 20. By a shaft 26 and the tape 11 passing over the feed drum 24 is fed downward past the window 15 for easy viewing of the tape and out through a lower aperture 17 where the tape may be grasped to pull the tape for setting or to cut off the tape for a permanent record.

Referring to FIG. 4 the shaft 26 is illustrated, shaft 26 supporting the drum 24 (shown in dotted lines). Drum 24 is rigidly affixed to shaft 26 so that it will be driven in a clockwise rotation in normal operation. Shaft 26 is provided with two flats 30 to permit affixing the drum 24. Shaft 26 is also provided with a groove 31 to permit affixing a split ring 32. Gear 33 is mounted on shaft 26 to be freely rotatable and gear 33 is provided with a hub portion 34 adjacent the split ring 32 and on its opposite side gear 33 is provided with a hub 35 that is threaded on its periphery. Shaft 26 is also provided with a groove 36 into which a split ring 37 is mounted so that gear 33 in the position as illustrated is freely rotatable or with gear 33 held stationary, shaft 26 will be freely rotatable. The end of shaft 26 adjacent the split ring 37 is provided with a reduced extension 38 which provides a shoulder 39 on shaft 26. A second portion or mating shaft 40 is provided having a circular aperture 41 in one end to permit the reduced extension 38 to fit snugly therein but to be freely rotatable therein. The end of shaft 40 having the circular aperture 41 is also provided with an internal threaded cup portion 42. The internal thread of the cup portion 42 mates with the external thread on hub portion 35. However, the external thread on the hub 35 and internal thread on cup 42 provide a left handed thread to require counter-clockwise rotation of cup 42 so that the internal face of cup 42 will abut with the shoulder 39 and will pull gear 33 toward the split ring 37 so that the face of the hub portion 35 will be frictionally compressed against the split ring 37 to retain gear 33 and cup 42 in a tight fitting relationship to be rotated with shaft 26. Shaft 40 may be provided with a knurled end portion 44 for manipulation by the hand or fingers. When shaft 26 is in its normal position as illustrated in FIG. 3, shaft 40 has been turned counter-clockwise so that the whole assembly is in a frictionally gripped relationship and gear 33 is in a driving relationship to drive drum 24 for feeding the tape 11. The rotation of gear 33 is in a clockwise direction. In the event that tape 11 is to be set for a starting operation, the knurled end 44 is turned clockwise releasing the frictional grip on gear 33 permitting drum 24 to be rotatable. Tape 11 may then be pulled downward, FIG. 3, and by watching through the window 15 of the casing 16 the markings on the tape will indicate when the exact minute of setting is at the point where the stylus or marking points are resting upon the tape. The knurled end 44 may then be rotated in a counter-clockwise direction regripping gear 33 and affixing the assembly in its driving relationship. The gear train and chronograph drive for gear 33 are not illustrated in FIG. 3.

Although applicant has illustrated a quick release for the normal drive of the tape in a counter indicating recorder, this quick release device may be utilized on any tape feeding device or any tape where it is essential to set the tape at an exact spot for a starting operation without departing from the spirit of this invention and this invention shall be limited only by the appended claims.

What is claimed is:

1. A tape recorder which includes a roll of recording tape, said tape marked with identifying minutes, hours and days, a chronograph actuated drive, connecting means between said tape recorder and said chronograph to move said tape past a recording point in sychronism with the passing of time, recording means to mark said tape at the recording point, said drive means for said tape includes a chronograph actuated gear that is rotatably and slidably mounted on a shaft that supports said roll of recording tape said shaft provided with a stop to restrict the slidable movement of said gear on said shaft, said gear provided with a threaded hub, a second shaft aligned with the first shaft and threadably secured to said hub of said gear, said gear slidable on said first shaft toward said second shaft to grip the stop on said first shaft and retain said gear and both shafts in an integral gripped relationship, and means to rotate said second shaft in the same direction of rotation as said drive means to release said gripped relationship and in turn release said driving relationship.

2. In a device according to claim 1 in which said second shaft is a hand operated shaft threaded to said gear hub to frictionally compress and engage said gear to said drive shaft for normal operation.

References Cited by the Examiner

UNITED STATES PATENTS

| | | | |
|---|---|---|---|
| 644,352 | 2/1900 | Duvall | 192—94 |
| 991,585 | 5/1911 | Wilson et al. | 346—136 X |
| 1,050,872 | 1/1913 | Torney | 346—136 |
| 2,142,492 | 1/1939 | Cannon | 346—93 X |
| 2,148,188 | 2/1939 | Chappell et al. | 346—136 |

RICHARD B. WILKINSON, *Primary Examiner.*

J. W. HARTARY, *Assistant Examiner.*